United States Patent
Jeon et al.

(10) Patent No.: US 11,318,722 B2
(45) Date of Patent: May 3, 2022

(54) METHOD FOR MANUFACTURING POLYMER FILM

(71) Applicants: SK INNOVATION CO., LTD., Seoul (KR); SK IE TECHNOLOGY CO., LTD., Seoul (KR)

(72) Inventors: Seung-Min Jeon, Daejeon (KR); Weon-Jung Choi, Daejeon (KR); Sang-Yoon Park, Daejeon (KR); Jin-Hyung Park, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 453 days.

(21) Appl. No.: 15/762,431

(22) PCT Filed: Sep. 23, 2016

(86) PCT No.: PCT/KR2016/010723
§ 371 (c)(1),
(2) Date: Mar. 22, 2018

(87) PCT Pub. No.: WO2017/052313
PCT Pub. Date: Mar. 30, 2017

(65) Prior Publication Data
US 2018/0272675 A1 Sep. 27, 2018

(30) Foreign Application Priority Data
Sep. 25, 2015 (KR) .................... 10-2015-0136548

(51) Int. Cl.
| | |
|---|---|
| *B32B 27/28* | (2006.01) |
| *C08J 5/18* | (2006.01) |
| *C08L 79/08* | (2006.01) |
| *C08G 73/10* | (2006.01) |

(Continued)

(52) U.S. Cl.
CPC ............ *B32B 27/281* (2013.01); *B32B 15/08* (2013.01); *C08G 73/10* (2013.01); *C08J 5/18* (2013.01);
(Continued)

(58) Field of Classification Search
CPC ........ B32B 27/281; B29C 41/24; B29C 41/28
See application file for complete search history.

(56) References Cited

U.S. PATENT DOCUMENTS

| | | | |
|---|---|---|---|
| 5,834,112 | A | 11/1998 | Maruoka et al. |
| 2004/0063900 | A1 | 4/2004 | Kaneshiro et al. |

(Continued)

FOREIGN PATENT DOCUMENTS

| | | | |
|---|---|---|---|
| JP | S5729425 A | * | 2/1982 |
| JP | S61264028 | * | 11/1986 |

(Continued)

OTHER PUBLICATIONS

JPS61264028 machine translation (Year: 1986).*

(Continued)

*Primary Examiner* — Timothy Kennedy
*Assistant Examiner* — Alexander A Wang
(74) *Attorney, Agent, or Firm* — IP & T Group LLP

(57) ABSTRACT

The present invention provides a method for manufacturing a polymer film, the method comprising the steps of: drying a polymer precursor to form a precursor film; and curing the precursor film to form a polymer film, wherein the drying is performed such that the content of a solvent remaining in the precursor film after the drying is 30% or less.

11 Claims, 1 Drawing Sheet

(51) Int. Cl.
*C09D 179/08* (2006.01)
*B32B 15/08* (2006.01)

(52) U.S. Cl.
CPC ............ *C08L 79/08* (2013.01); *C09D 179/08* (2013.01); *B32B 2250/02* (2013.01); *B32B 2311/12* (2013.01); *B32B 2311/30* (2013.01); *C08J 2379/08* (2013.01); *C08L 2203/16* (2013.01)

(56) References Cited

U.S. PATENT DOCUMENTS

| | | | |
|---|---|---|---|
| 2004/0265601 A1 | 12/2004 | Hoshida et al. | |
| 2007/0071910 A1* | 3/2007 | Ono | B32B 15/08 428/1.1 |
| 2010/0230142 A1* | 9/2010 | Bamba | H05K 3/0055 174/255 |
| 2012/0292800 A1* | 11/2012 | Higuchi | C08J 5/18 264/40.1 |
| 2017/0198164 A1* | 7/2017 | Itagaki | B32B 27/36 |

FOREIGN PATENT DOCUMENTS

| | | | |
|---|---|---|---|
| JP | 6-25269 | | 4/1994 |
| JP | 11-70562 | | 3/1999 |
| JP | 2001170954 | * | 6/2001 |
| JP | 2014-118463 | | 6/2014 |
| KR | 1020070022776 | | 2/2007 |
| KR | 10-2008-0045295 A | | 5/2008 |
| KR | 1020090065750 | | 6/2009 |
| KR | 1020110031293 | | 3/2011 |
| KR | 1020120078510 | | 7/2012 |

OTHER PUBLICATIONS

JPS5729425A machine translation (Year: 1982).*
JPS5729425A abstract (Year: 1982).*
Machine translation of JP2001170954 (Year: 2001).*
Office Action issued by the Korean Intellectual Property Office dated Nov. 23, 2021.

* cited by examiner

METHOD FOR MANUFACTURING POLYMER FILM

This application is a national stage application of PCT/KR2016/010723 filed on Sep. 23, 2016, which claims priority of Korean patent application number 10-2015-0136548 filed on Sep. 25, 2015. The disclosure of each of the foregoing applications is incorporated herein by reference in its entirety.

TECHNICAL FIELD

The present disclosure relates to a method for manufacturing a polymer film.

BACKGROUND ART

Polymer films are widely used as insulative materials for forming circuits and devices, as polymer films have outstanding heat-resistance, mechanical, and electrical characteristics.

In recent years, materials improved in terms of heat resistance, such as polyethylene terephthalate (PET), polyethylene naphthalate (PEN), or polyethylene sulfone (PES), have been developed, and the use these materials as transparent materials in the electronic material field has been attempted. However, the heat resistance of such materials remains unsatisfactory, and thus, there is increasing need for polymer films, such as a polyimide film, capable of overcoming this problem.

In general, polymer films are manufactured through a solution casting process, a drying process, and a high-temperature heat treatment process, and particularly, high-temperature heat treatment equipment, including a heat-treatment tenter device, is used in the high-temperature heat treatment process. However, such a heat-treatment tenter device is significantly expensive and requires a high-degree of operational skill, and thus it is difficult to manufacture a polymer film using heat treatment equipment including such a device.

DISCLOSURE

Technical Problem

One of the aspects of the present disclosure is to provide a method for easily manufacturing a polymer film with low cost and a high yield.

Technical Solution

One of proposals of the present disclosure is to provide a polymer film manufacturing method designed to perform a curing process without using a relatively expensive tenter device by performing a drying process in such a manner that the content of a solvent remaining in a dried film is 30% or less.

According to an aspect of the present disclosure, a method for manufacturing a polymer film may include: drying a polymer precursor to form a precursor film; and curing the precursor film to form a polymer film, wherein the drying the polymer precursor may be performed such that the precursor film may have a residual solvent content of 30% or less after drying.

According to another aspect of the present disclosure, a method for manufacturing a polymer film may include: transferring a wound base film to a drying apparatus; casting a polymer precursor onto the base film during the transferring of the base film; drying the polymer precursor, cast onto the base film during the transferring, by using the drying apparatus to form a precursor film; stripping the precursor film from the base film; and after transferring the precursor film to a curing apparatus, curing the precursor film using the curing apparatus to form a polymer film, wherein the drying the polymer precursor may be performed such that the precursor film may have a residual solvent content of 30% or less after drying.

Advantageous Effects

One of effects of the present disclosure is to provide a method for easily manufacturing a polymer film with low cost and a high yield.

BEST MODE

Figure 1:
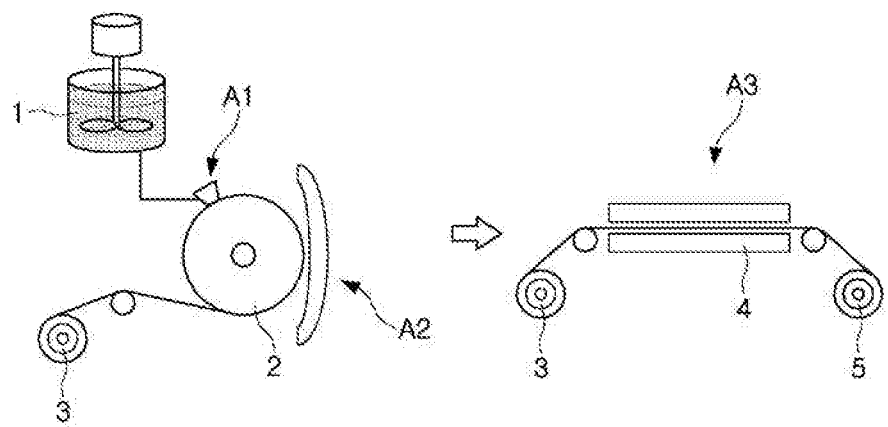
FIG. 1 is a schematic view illustrating an exemplary polymer film manufacturing processes.

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity. Furthermore, in the drawings illustrating embodiments, the same reference numerals may be used throughout to designate elements having the same function within the same technical scope.

FIG. 1 is a schematic view illustrating an exemplary polymer film manufacturing process.

Referring to FIG. 1, according to an embodiment, a polymer film manufacturing method includes a process of forming a precursor film 3 by drying a polymer precursor 1 and a process of curing the precursor film 3 to form a polymer film 5, wherein the drying of the polymer precursor 1 is performed such that the content of a solvent remaining in the precursor film 3 is 30% or less after the drying.

In detail, the polymer film manufacturing method of the embodiment includes a process A1 of casting a polymer precursor 1, a process A2 of drying the cast polymer precursor 1, and a process A3 of performing a high-temperature heat treatment on the dried polymer precursor 3 to manufacture a polymer film 5.

A drying apparatus 2 including a belt device or a drum device is used to perform the casting process A1 and the drying process A2. However, a high-temperature heat treatment apparatus 4 including a tenter device is not used to perform the high-temperature heat treatment process A3.

Since the drying process A2 is controlled to adjust the content of a solvent remaining in the precursor film 3 after the drying process A2 is 30% or less, contraction of the precursor film 3 may be minimized during the curing process, and thus a heat treatment apparatus including a tenter device may not be required in the curing process. Thus, the polymer film 5 may be more easily manufactured at low cost and with a high yield.

Figure 2:
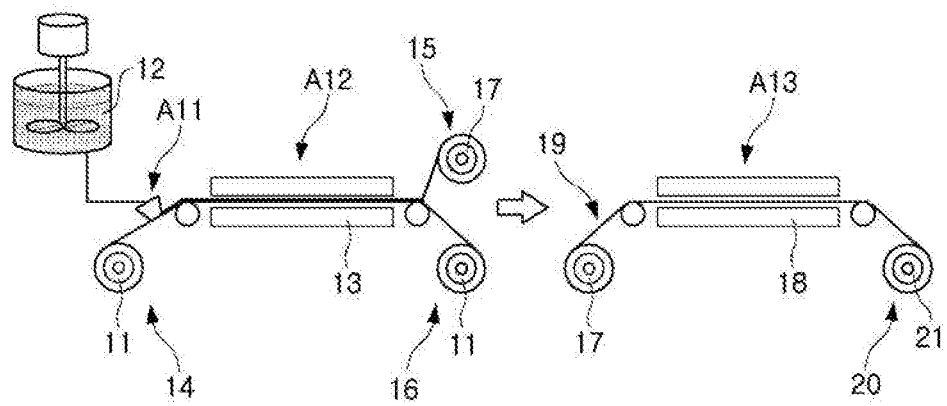
FIG. 2 is a schematic view illustrating other exemplary polymer film manufacturing processes.

FIG. 2 is a schematic view illustrating other exemplary polymer film manufacturing processes.

Referring to FIG. 2, in a polymer film manufacturing method according to another embodiment, a heat treatment apparatus, not including a tenter device, may be used in a curing process, and furthermore, a drying apparatus including a belt device or a drum device may not be used in a drying process.

In more detail, the polymer film manufacturing method of the embodiment includes: a process of transferring a wound base film 11 to a drying apparatus 13; a process A11 of casting a polymer precursor 12 onto the base film 11 while the base film 11 is transferred; a process A12 of drying the polymer precursor 12 cast onto the base film 11 using the drying apparatus 13 to form a precursor film 17; a process of stripping the precursor film 17 from the base film 11; and a process A13 of curing the precursor film 17 using a curing apparatus 18 after transferring the precursor film 17 to the curing apparatus 18 so as to form a polymer film 21, wherein the drying process A12 may be performed such that the content of a solvent remaining in the precursor film 17 may be 30% or less after the drying process A12.

According to the polymer film manufacturing method of the embodiment, casting and drying may be performed using a base film instead of using a belt device or a drum device, and thus a drying apparatus including a belt device or a drum device may not be used during the drying process. In this case, a polymer film 21 may more easily manufactured with lower costs and a higher yield when compared to the case of not using only a tenter device.

Hereinafter, each process of the polymer film manufacturing method of the present disclosure will be described in more detail. Although the following description is given for the case in which a drying apparatus including a belt device or a drum device is not used in a drying process as described in FIG. 2, embodiments of the present disclosure are not limited thereto. That is, for example, as long as a precursor film has a residual solvent content of 30% or less after a drying process, a drying apparatus including a belt device or a drum device may be used as described with reference to FIG. 1.

Base Film Preparing Process

Since a drying process A12 is performed on a base film 11 in a state in which a polymer precursor 12 is cast onto a side of the base film 11, the base film 11 is required to have sufficient heat resistance. In addition, the base film 11 is required to have sufficient releasability such that a polymer film 21 may be easily stripped from the base film 11 after the drying process A12. The heat resistance and releasability of the base film 11 are affected by factors such as the thickness and surface roughness of the base film 11.

The base film 11 may be one selected from the group consisting of polyimide film, copper foil, aluminum foil, stainless steel foil, copper foil coated with polyimide, aluminum foil coated with polyimide, and stainless steel foil coated with polyimide. However, the base film 11 is not limited thereto.

The polyimide, included in the polyimide film, the copper foil coated with polyimide, the aluminum foil coated with polyimide, and the stainless steel foil coated with polyimide that are listed as examples of the base film 11, may be manufactured by combining dianhydride and diamine.

Examples of the dianhydride may include pyromellitic dianhydride (PMDA), 3,3',4,4'-biphenyl tetracarboxylic dianhydride (BPDA), 3,3',4,4'-benzophenone tetracarboxylic dianhydride (BTDA), 4,4'-oxydiphthalic anhydride (ODPA), 3,3',4,4'-diphenylsulfone tetracarboxylic dianhydride (DSDA), 2,2-bis(3,4-dicarboxyphenyl)1,1,1,3,3,3-hexafluoropropane dianhydride (6FDA), 4,4'-(4,4'-isopropylidenediphenoxy)bis(phthalic anhydride) (BPADA), 2,3,6,7-naphthalene tetracarboxylic dianhydride, 1,2,5,6-naphthalene tetracarboxylic dianhydride, 1,4,5,8-naphthalene tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,3',4'-biphenyl tetracarboxylic dianhydride, 2,2',3,3'-biphenyl tetracarboxylic dianhydride, 2,3,3',4'-benzophenone tetracarboxylic dianhydride, 2,2',3,3'-benzophenone tetracarboxylic dianhydride, 2,2-bis(3,4-dicarboxyphenyl) propane dianhydride, 1,1-bis(2,3-dicarboxyphenyl)ethane dianhydride, 1,1-bis(3,4-dicarboxyphenyl)ethane dianhydride, bis-(2,3-dicarboxyphenyl)methane dianhydride, bis-(3,4-dicarboxyphenyl)methane dianhydride, 4,4'-(hexafluoroisopropylidene) isophthalic anhydride, bis-(3,4-dicarboxyphenyl)sulfoxide dianhydride, tetrahydrofuran-2,3,4,5-tetracarboxylic dianhydride, pyrazine-2,3,5,6-tetracarboxylic dianhydride, thiophene-2,3,4,5-tetracarboxylic dianhydride, phenanthrene-1,8,9,10-tetracarboxylic dianhydride, perylene-3,4,9,10-tetracarboxylic dianhydride, bis-1,3-isobenzofurandione, bis-(3,4-dicarboxyphenyl)thioether dianhydride, bicyclo[2,2,2]oct-7-ene-2,3,5,6-tetracarboxylic dianhydride, 2-(3',4'-dicarboxyphenyl) 5,6-dicarboxybenzamidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, bis-(3,4-dicarboxyphenyl) 2,5-oxadiazole 1,3,4-dianhydride, bis-2,5-(3',4'-dicarboxydiphenylether) 1,3,4-oxadiazole dianhydride, bis-2,5-(3',4'-dicarboxydiphenylether) 1,3,4-oxadiazole dianhydride, 5-(2,5-dioxotetrahydro)-3-methyl-3-cyclohexene-1,2-dicarboxylic anhydride, 1,2,3,4-cyclobutane dianhydride, 2,3,5-tricarboxycyclopentylacetic dianhydride, and their acid ester and acid halide ester derivatives. However, the dianhydride is not limited thereto. That is, another well-known dianhydride may be used.

Examples of the diamine may include: at least one aromatic diamine selected from the group consisting of p-phenylenediamine, m-phenylenediamine, 2,4,6-trimethyl-1,3-phenylenediamine, 2,3,5,6-tetramethyl-1,4-phenylenediamine, 4,4'-diaminodiphenylether, 3,4'-diaminodiphenylether, 3,3'-diaminodiphenylether, 4,4'-diaminodiphenylsulfide, 4,4'-diaminodiphenylmethane, 3,4'-diaminodiphenylmethane, 3,3'-diaminodiphenylmethane, 4,4'-methylene-bis(2-methylaniline), 4,4'-methylene-bis(2,6-dimethylaniline), 4,4'-methylene-bis(2,6-diethylaniline), 4,4'-methylene-bis(2-isopropyl-6-methylaniline), 4,4'-methylene-bis(2,6-diisopropylaniline), 4,4'-diaminodiphenylsulfone, 3,3'-diaminodiphenylsulfone, benzidine, o-tolidine, m-tolidine, 3,3', 5,5'-tetramethylbenzidine, 2,2'-bis(trifluoromethyl) benzidine, 1,4-bis(4-aminophenoxy)benzene, 1,3-bis(4-aminophenoxy)benzene, 1,3-bis (3-aminophenoxy)benzene, bis[4-(4-aminophenoxy)phenyl]sulfone, bis[4-(3-aminophenoxy)phenyl]sulfone, 2,2-bis[4-(4-aminophenoxy) phenyl]propane, and 2,2-bis[4-(3-aminophenoxy)phenyl] propane; and at least one aliphatic diamine selected from the group consisting of 1,6-hexanediamine, 1,4-cyclohexanediamine, 1,3-cyclohexanediamine, 1,4-bis(aminomethyl)cyclohexane, 1,3-bis(aminomethyl)cyclohexane, 4,4'-diaminodicyclohexylmethane, and 4,4'-diamino-3,3'- dimethyldicyclohexylmethane. In addition, the diamine may be a mixture of an aromatic diamine and an aliphatic diamine. However, the diamine is not limited thereto. For example, another well-known diamine may be used.

If the base film 11 is a polyimide film, the polyimide film may satisfy $T1 \geq 0.5 \times T2$ where T1 denotes the thickness of the polyimide film, and T2 denotes a target thickness of a polymer film to be manufactured. If the polyimide film does not satisfy the condition, the polyimide film may not resist curling of the polymer precursor 12 when the polyimide film is dried after being coated with the polymer precursor 12.

If the base film 11 is one of copper foil, aluminum foil, stainless steel foil, copper foil coated with polyimide, aluminum foil coated with polyimide, and stainless steel foil coated with polyimide, the base film 11 may satisfy $T3 \geq 0.1 \times T2$ where T3 denotes the thickness of the base film 11, and T2 denotes a target thickness of a polymer film to be manufactured. If the base film 11 is one of copper foil, aluminum foil, stainless steel foil, copper foil coated with polyimide, aluminum foil coated with polyimide, and stainless steel foil coated with polyimide that do not satisfy the condition, the base film 11 may not resist curling of the polymer precursor 12 when the base film 11 is dried after coated with the polymer precursor 12.

A side of the base film 11 onto which the polymer precursor 12 is cast may have a surface roughness RZ of 0.01 nm to 1000 nm. If the surface roughness of the base film 11 is greater than the range, the surface roughness of the base film 11 may be transferred to a manufactured polymer film 21, and thus the polymer film 21 may have poor optical characteristics. Surface roughness may be measured by a method commonly used in the related art. For example, surface roughness may be measured using Mitutoyo SJ-401. For example, a polymer film may be cut to a size of 10 mm×10 mm, and after placing the polymer film on glass, the surface roughness of the polymer film may be measured while moving a tip at a rate of 0.1 mm/s.

The width and length of the base film 11 are not particularly limited. For example, the width and length of the base film 11 may vary according to the width and length of a polymer film 21 to be manufactured. For example, the base film 11 may have a width of about 100 mm to about 5000 mm and a length of about 10 m to about 2000 m.

The base film 11 may be prepared in a wound state. In this case, the polymer precursor 12 may be cast (process A11) and dried (process A12) by a roll-to-roll method to reduce manufacturing costs and improve production yield.

Polymer Precursor Casting Process

A polyimide precursor having a solid content within the range of 3 wt % to 30 wt % and a viscosity within the range of about 1,000 cPs to about 500,000 cPs may be cast (process A11) as the polymer precursor 12 onto the base film 11. In this case, the polyimide precursor may include fluorine or may not include fluorine. If the polyimide precursor includes fluorine, the content of fluorine in the polyimide precursor may range from 1 wt % to 30 wt % based on the total weight of carbon in the polyimide precursor. The polyimide precursor may be manufactured by combining dianhydride and diamine.

For example, the dianhydride may include at least one selected from the group consisting of pyromellitic dianhydride (PMDA), 3,3',4,4'-biphenyl tetracarboxylic dianhydride (BPDA), 3,3',4,4'-benzophenone tetracarboxylic dianhydride (BTDA), 4,4'-oxydiphthalic anhydride (ODPA), 3,3',4,4'-diphenylsulfone tetracarboxylic dianhydride (DSDA), 2,2-bis(3,4-dicarboxyphenyl)1,1,1,3,3,3-hexafluoropropane dianhydride (6FDA), 4,4'-(4,4'-isopropylidenediphenoxy)bis(phthalic anhydride) (BPADA), 2,3,6,7-naphthalene tetracarboxylic dianhydride, 1,2,5,6-naphthalene tetracarboxylic dianhydride, 1,4,5,8-naphthalene tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,3',4'-biphenyl tetracarboxylic dianhydride, 2,2',3,3'-biphenyl tetracarboxylic dianhydride, 2,3,3',4'-benzophenone tetracarboxylic dianhydride, 2,2',3,3'-benzophenone tetracarboxylic dianhydride, 2,2-bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis-(2,3-dicarboxyphenyl)methane dianhydride, bis-(3,4-dicarboxyphenyl)methane dianhydride, 4,4'-(hexafluoroisopropylidene) isophthalic anhydride, bis-(3,4-dicarboxyphenyl)sulfoxide dianhydride, tetrahydrofuran-2,3,4,5-tetracarboxylic dianhydride, pyrazine-2,3,5,6-tetracarboxylic dianhydride, thiophene-2,3,4,5-tetracarboxylic dianhydride, phenanthrene-1,8,9,10-tetracarboxylic dianhydride, perylene-3,4,9,10-tetracarboxylic dianhydride, bis-1,3-isobenzofurandione, bis-(3,4-dicarboxyphenyl)thioether dianhydride, bicyclo[2,2,2]oct-7-ene-2,3,5,6-tetracarboxylic dianhydride, 2-(3',4'-dicarboxyphenyl) 5,6-dicarboxybenzamidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, bis-(3,4-dicarboxyphenyl) 2,5-oxadiazole 1,3,4-dianhydride, bis-2,5-(3',4'-dicarboxydiphenylether) 1,3,4-oxadiazole dianhydride, bis-2,5-(3',4'-dicarboxydiphenylether) 1,3,4-oxadiazole dianhydride, 5-(2,5-dioxotetrahydro)-3-methyl-3-cyclohexene-1,2-dicarboxylic anhydride, 1,2,3,4-cyclobutane dianhydride, and 2,3,5-tricarboxycyclopentylacetic dianhydride. However, the dianhydride is not limited thereto. For example, another well-known dianhydride may be used.

Examples of the diamine may include: at least one aromatic diamine selected from the group consisting of p-phenylenediamine, m-phenylenediamine, 2,4,6-trimethyl-1,3-phenylenediamine, 2,3,5,6-tetramethyl-1,4-phenylenediamine, 4,4'-diaminodiphenylether, 3,4'-diaminodiphenylether, 3,3'-diaminodiphenylether, 4,4'-diaminodiphenylsulfide, 4,4'-diaminodiphenylmethane, 3,4'-diaminodiphenylmethane, 3,3'-diaminodiphenylmethane, 4,4'-methylene-bis (2-methylaniline), 4,4'-methylene-bis(2,6-dimethylaniline), 4,4'-methylene-bis(2,6-diethylaniline), 4,4'-methylene-bis (2-isopropyl-6-methylaniline), 4,4'-methylene-bis(2,6-diisopropylaniline), 4,4'-diaminodiphenylsulfone, 3,3'-diaminodiphenylsulfone, benzidine, o-tolidine, m-tolidine, 3,3', 5,5'-tetramethylbenzidine, 2,2'-bis(trifluoromethyl) benzidine, 1,4-bis(4-aminophenoxy)benzene, 1,3-bis (4-aminophenoxy)benzene, 1,3-bis (3-aminophenoxy)benzene, bis[4-(4-aminophenoxy)phenyl]sulfone, bis[4-(3-aminophenoxy)phenyl]sulfone, 2,2-bis[4-(4-aminophenoxy) phenyl]propane, and 2,2-bis[4-(3-aminophenoxy)phenyl] propane; and at least one aliphatic diamine selected from the group consisting of 1,6-hexanediamine, 1,4-cyclohexanediamine, 1,3-cyclohexanediamine, 1,4-bis(aminomethyl)cyclohexane, 1,3-bis(aminomethyl)cyclohexane, 4,4'-diaminodicyclohexylmethane, and 4,4'-diamino-3,3'-dimethyldicyclohexylmethane. However, the diamine is not limited thereto, and another well-known diamine may be used.

For ease of description, the case in which the polymer precursor 12 is a polyimide precursor is described. However, the polymer precursor 12 is not limited to the polyimide precursor. That is, any polymer precursor such as polyamide or polyamideimide that is used for manufacturing transparent film in the related art may be used.

A well-known solvent may be used. For example, at least one polar solvent selected from m-cresol, N-methyl-2-pyrrolidone (NMP), dimethylformamide (DMF), dimethylacetamide (DMAc), dimethyl sulfoxide (DMSO), acetone, and diethyl acetate may be used. In addition, a low boiling point solvent such as tetrahydrofuran (THF) or chloroform, or a low-absorption solvent such as γ-butyrolactone may be used.

Before the polymer precursor 12 is cast onto the base film 11 (process A11), the base film 11 is stably disposed. A roll-to-roll apparatus including an unwinder 14 and rewinders 15 and 16 may be used to stably dispose the base film 11. If the roll-to-roll apparatus is used, a casting belt or drum may not be used because the base film 11 is directly coated with a solution of the polymer precursor 12 when the base film 11 is transferred to the drying apparatus 13 after the base film 11 is connected between the unwinder 14 and the rewinder 16. Although not specifically shown in the drawings, guide rolls may guide the base film 11 between the unwinder 14 and the rewinders 15 and 16, and the base film 11 may be coated with a solution of the polymer precursor 12 in a position on a coating roll.

The unwinder 14 and the rewinders 15 and 16 of the roll-to-roll apparatus may apply a certain degree of tension to the base film 11 such that the casting process A11 and the drying process A12 may be stably performed. In this case, the tension may range from 1 N to 1000 N.

Polymer Precursor Drying Process

After the polymer precursor 12 is cast onto the base film 11, the polymer precursor 12 is dried using the drying apparatus 13. As a result, a precursor film 17 is formed on the base film 11. The drying apparatus 13 may be integrated with the roll-to-roll apparatus. Therefore, the drying process A12 may be performed in a state in which the polymer precursor 12 is cast onto at least one side of the base film 11, and the unwinder 14 and the rewinders 15 and 16 apply tension to the base film 11. In this case, the tension may range from 1 N to 1000 N.

The drying process A12 may be performed in a chamber isolated from the outside. In other words, the drying apparatus 13 may include a drying chamber. In this case, the pressure inside the drying chamber may range from about −500 Pa to about 500 Pa. Nitrogen or argon may be introduced into the drying chamber. The drying apparatus 13 is not limited to a particular type. For example, a drying apparatus well known in the related art may be used as the drying apparatus 13.

In the drying process A12, the polymer precursor 12 cast onto the base film 11 may be dried at a temperature of 60° C. to 150° C. The drying process A12 may be performed for about 16 minutes to about 60 minutes. If the drying process A12 is performed for less than 16 minutes, the polymer precursor 12 may not be sufficiently dried, and if the drying process A12 is performed for more than 60 minutes, manufacturing costs may increase.

The drying process A12 may be performed such that the precursor film 17 may have a residual solvent content of 30% or less, for example, of about 7% to about 20% after the drying process A12. In this case, contraction may occur minimally in a later curing process, and thus a heat treatment apparatus including a tenter device may not be used in the curing process. Thus, a polymer film 21 may be more easily manufactured with low costs and a high yield.

Figure 4:
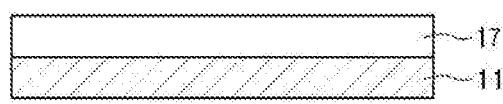
FIG. 4 is a cross-sectional view schematically illustrating an example of a precursor film formed on a base film.

FIG. 4 is a cross-sectional view schematically illustrating an example of the precursor film 17 formed on the base film 11.

Referring to FIG. 4, the precursor film 17 is formed on the base film 11. Unlike in FIG. 4, the polymer precursor 12 may be cast onto both sides of the base film 11 and may be dried to form precursor films 17 on both the sides of the base film 11.

Precursor Film Stripping Process

The precursor film 17 is stripped from the base film 11. A stripping apparatus may include the two rewinders 15 and 16 to respectively wind the base film 11 and the precursor film 17.

Precursor Film Curing Process

After stripping the precursor film 17, the precursor film 17 is cured using the curing apparatus 18. Curing of the polymer precursor film 17 may also be performed using a roll-to-roll apparatus, and in this case, the roll-to-roll apparatus may include an unwinder 19, a rewinder 20, and the curing apparatus 18. In this case, a curing process A13 may be performed in a state in which the unwinder 19 and the rewinder 20 apply a certain degree of tension to the precursor film 17. For example, the tension may range from 1 N to 1000 N.

The curing apparatus 18 is not limited to a particular type. In a non-limiting example, an apparatus configured to transfer heat by irradiating a film with infrared (IR) rays may be used as the curing apparatus 18.

The curing process A13 may be performed in a chamber isolated from the outside. In other words, the curing apparatus 18 may include a heat treatment chamber. In this case, the pressure inside the heat treatment chamber may range from −500 Pa to 500 Pa. Nitrogen or argon may be introduced into the heat treatment chamber.

The curing process A13 may be performed by heat treating the precursor film 17 at a temperature of 80° C. to 500° C. The curing process A13 may be performed for 2 minutes to 100 minutes. If the curing process A13 is performed for less than 2 minutes, the precursor film 17 may not be sufficiently heat-treated, and thus an imide film may not be formed. Conversely, if the curing process A13 is performed for more than 100 minutes, manufacturing costs may increase.

The contraction of a manufactured polymer film 21 in a transverse direction TD may be 10% or less, for example, about 0% to about 5%, as compared to the precursor film 17. As described above, widthwise contraction may be minimized by adjusting the residual solvent content of the precursor film 17, and thus a heat treatment apparatus including a tenter device may not be used.

The polymer film 21 may have a light transmittance of 80% or greater and a haze of less than 10% in a visible light region. The light transmittance and haze may be measured by a method commonly used in the related art. For example, COH400 by Nippon Denshoku may be used to measure light transmittance and haze. In detail, the polymer film 21 may be cut to a size of 50 mm×50 mm and placed in a path of an optical source, and then the light transmittance and haze of the polymer film 21 may be measured according to the wavelength of light.

Figure 3:
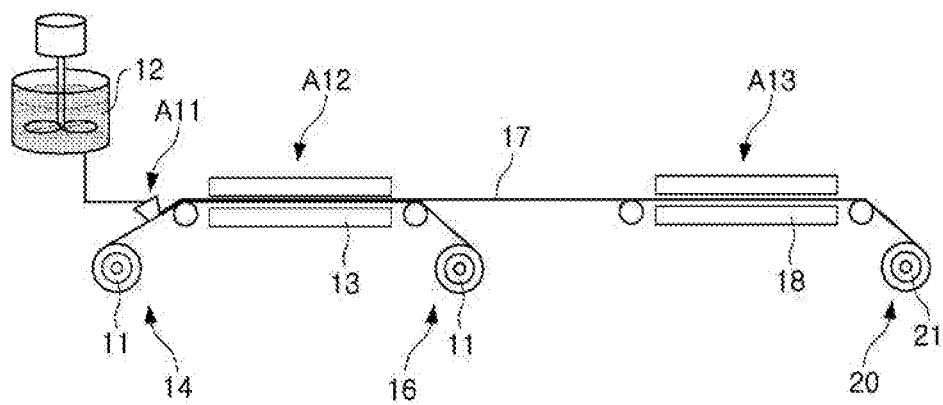
FIG. 3 is a schematic view illustrating other exemplary polymer film manufacturing processes.

Although FIG. 2 illustrates the drying process and the curing process that are not continuous, this is an example. That is, unlike the illustration, the drying process and the curing process may be continuously performed. That is, as illustrated in FIG. 3, the precursor film 17 formed through the drying process A12 may not be wound but may be continuously transferred to the curing apparatus 18, and the curing process A13 may be continuously performed.

MODE FOR INVENTION

Examples

Table 1 shows results of inspection on defects of transparent polyimide films according to drying conditions. In examples and comparative examples in Table 1, as described above, a drying process was performed using a drying apparatus including an unwinder, rewinders, and a drying chamber, and a curing process was performed using a heat treatment apparatus including an unwinder, a rewinder, a curing apparatus, and a heat treatment chamber. In addition, a polymer precursor was prepared by mixing bis(trifluoromethyl)-[1,1'-biphenyl]-4,4'-diamine (TFMB) with 2,2'-bis-(3,4-dicarboxyphenyl)hexafluoropropane dianhydride (6FDA) at a mole ratio of 1:1, and the prepared polymer precursor had a solid content of 15 wt % and a viscosity of 12,000 cPs. In a polymer precursor casting process, the polymer precursor was discharged at a set rate of 38.6 rpm.

Base films and polymer films manufactured under the conditions of the examples and the comparative examples were observed with the naked eye to check for defects. A polymer film observed as having a defect, such as twisting, deformation, contraction in a length direction MD or transverse direction TD, or drying failure, was evaluated as being "poor", and a polymer film observed as not having such a defect was determined as being "good."

TABLE 1

| | Drying Temp. (Max/Min) (° C.) | Drying time (minute) | ***HT temp. (Max/Min) (° C.) | HT time (minute) | Residual solvent after drying (%) | TD width variation after HT (%) | Evaluation |
|---|---|---|---|---|---|---|---|
| *E1 | 60/110 | 25 | 110/300 | 60 | 20 | 2 | Good |
| E2 | 60/120 | 25 | 110/300 | 60 | 8.75 | 0.4 | Good |
| E3 | 60/130 | 25 | 110/300 | 60 | 7.2 | 0.4 | Good |
| E4 | 60/130 | 16 | 110/300 | 60 | 12.5 | 1 | Good |
| E5 | 60/130 | 25 | 110/300 | 60 | 30 | 4 | Good |
| **CE1 | 60/90 | 25 | 110/300 | 60 | 40 | 20 | Poor |
| CE22 | 60/110 | 16 | 110/300 | 60 | 34.2 | 13 | Poor |
| CE33 | 60/120 | 16 | 110/300 | 60 | 31 | 11 | Poor |

*E: Example,
**CE: Comparative Example,
***HT: Heat Treatment

Referring to Table 1, transparent polyimide films of Examples 1 to 5, which were prepared at a drying temperature of 60° C. to 130° C. for a drying time of 16 minutes to 60 minutes to have a residual solvent content of 30% or less, were evaluated as being "good." However, polyimide films of Comparative Examples 1 to 3 having a residual solvent content of 30% or greater were observed as having deformation such as contraction of greater than 10% in the transverse direction TD after a heat treatment process.

While embodiments of the present disclosure have been shown and described above, the scope of the present invention is not limited thereto, and it will be apparent to those skilled in the art that modifications and variations could be made without departing from the scope of the present invention as defined by the appended claims.

| [Descriptions of reference numerals] | |
|---|---|
| 1: polymer precursor | 2: drying apparatus |
| 3: dried polymer precursor | 4: heat treatment apparatus |
| 5: polymer film | A1: casting process |
| A2: drying process | A3: curing process |
| 11: base film | 12: polymer precursor |
| 13: drying apparatus | 14: unwinder |
| 15, 16: rewinders | 17: precursor film |
| 18: curing apparatus | 19: unwinder |
| 20: rewinder | 21: polymer film |

-continued

| [Descriptions of reference numerals] | |
|---|---|
| A11: casting process | A12: drying process |
| A13: curing process | |

The invention claimed is:

1. A method for manufacturing a polymer film, the method comprising:
   casting a solution containing a polymer precursor on a base film selected from the group consisting of a polyimide film, a copper foil coated with polyimide, an aluminum foil coated with polyimide, and a stainless steel foil coated with polyimide;
   drying the solution containing the polymer precursor to form a precursor film; and
   curing the precursor film to form the polymer film,
   wherein the solution containing the polymer precursor is a polyimide precursor,
   wherein the polymer film is a polyimide film,
   wherein the drying of the solution containing the polymer precursor is performed such that the precursor film has a residual solvent content of 12.5% or less after drying,
   wherein a side of the base film onto which the solution containing the polymer precursor is casted has a surface roughness RZ of 0.01 nm to 1000 nm,
   wherein the polymer film formed after the curing of the precursor film has a haze of less than 10% and a light transmittance of 80% or greater in a visible light region,
   wherein the drying of the solution containing the polymer precursor is performed at a temperature of 60° C. to 150° C. and for a time of 16 minutes to 60 minutes,
   wherein the curing of the precursor film is performed using a roll-to-roll apparatus comprising an unwinder and a rewinder, and
   wherein the unwinder and the rewinder apply a predetermined degree of tension ranging from 1 N to 1000 N to the precursor film during the curing of the precursor film.

2. The method of claim 1, wherein the drying of the solution containing the polymer precursor is performed such that the precursor film has a residual solvent content of 7% to 12.5% after drying.

3. The method of claim 1, wherein after the curing of the precursor film, the polymer film shows a contraction of 10% or less in a transverse direction (TD) compared to the precursor film before curing.

4. The method of claim 1, further comprising:
  stripping the precursor film from the base film before the curing of the precursor film.

5. The method of claim 1, wherein the curing of the precursor film is performed at a temperature of 110° C. to 500° C.

6. The method of claim 5, wherein the curing of the precursor film is performed for 2 minutes to 100 minutes.

7. The method of claim 1, wherein the roll-to-roll apparatus does not comprise a tenter device.

8. The method of claim 4 further comprising:
  winding the base film and transferring it to a drying apparatus before the casting of the solution containing the polymer precursor onto the base film,
  wherein the casting of the solution containing the polymer precursor and the drying of the solution containing thee polymer precursor to form thee precursor film are performed during the transferring.

9. The method of claim 8, wherein the curing of the precursor film to form the polymer film comprises transferring the stripped precursor film to a curing apparatus and curing the stripped precursor film using the curing apparatus to form the polymer film.

10. The method of claim 1, wherein the drying of the solution containing the polymer precursor is performed at a temperature of 60° C. to 130° C. for 16 minutes to 25 minutes such that the precursor film has a residual solvent content of 7.2% to 8.7% after drying.

11. The method of claim 10, wherein after the curing of the precursor film, the polymer film shows a contraction of 0.4% to 1% in a transverse direction (TD) compared to the precursor film before curing.

* * * * *